Jan. 24, 1939.                H. E. KENNEDY ET AL                2,145,010
                              AUTOMATIC ELECTRIC WELDING
                         Filed Nov. 9, 1934          2 Sheets-Sheet 1
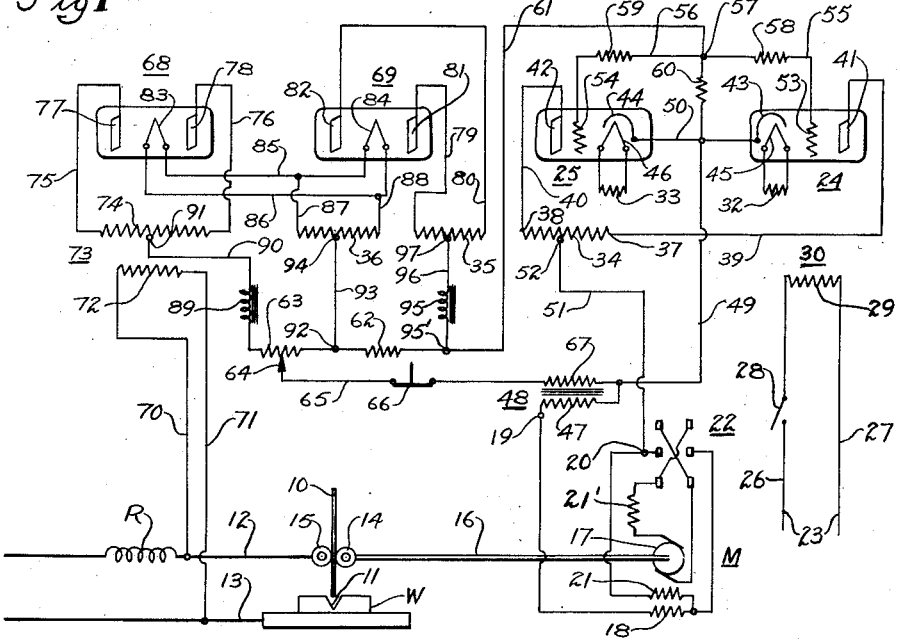
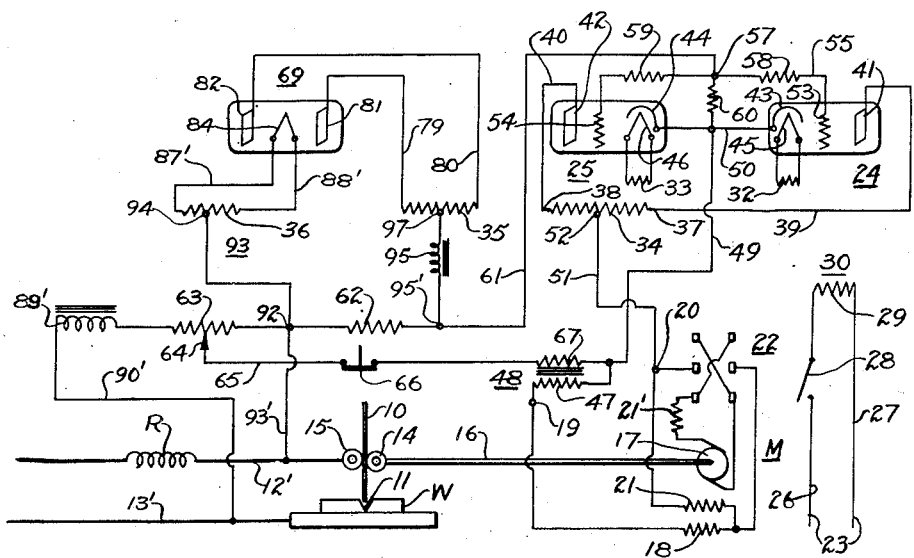
INVENTORS
HARRY E. KENNEDY
MAYNARD A. ROTERMUND
BY LLOYD T. JONES
ATTORNEY Jan. 24, 1939.  H. E. KENNEDY ET AL  2,145,010
AUTOMATIC ELECTRIC WELDING
Filed Nov. 9, 1934    2 Sheets-Sheet 2

INVENTORS
HARRY E. KENNEDY
MAYNARD A. ROTERMUND
LLOYD T. JONES
BY [signature]
ATTORNEY Patented Jan. 24, 1939

2,145,010

UNITED STATES PATENT OFFICE 2,145,010

AUTOMATIC ELECTRIC WELDING

Harry E. Kennedy, Maynard A. Rotermund, and Lloyd T. Jones, Berkeley, Calif., assignors, by mesne assignments, to Union Carbide and Carbon Corporation, a corporation of New York Application November 9, 1934, Serial No. 752,245

32 Claims. (Cl. 219—8)

This invention relates to automatic electric welding, and more particularly to an improved system for automatically controlling the feeding of a welding electrode adapted to be fused and deposited upon the work which may constitute a cooperative electrode.

To produce strong welds of uniform quality it is essential to heat the work evenly along the line of weld. In order to provide uniform welding heat in any form of electric welding in which a fusible electrode is fed to the work, it is desirable to maintain the position of the fusing end of the electrode substantially constant with respect to the work.

The principal objects of this invention are to provide an improved system which is sensitive to the slightest change in a condition of a welding circuit and responds quickly after the change occurs for automatically controlling the feeding of an electrode to maintain the position of the fusing end thereof substantially constant with respect to the work; to provide such a system in which the feeding of an electrode is controlled in accordance with the differential value of a condition of the welding circuit and the condition of a circuit that is maintained at substantially a constant value; and to provide an electrode feeding system in which the flow of current to the electrically operable feeding means is controlled through the agency of a space discharge device.

The above and other objects of our invention will become apparent from the following description and accompanying drawings, in which:

Fig. 1 diagrammatically illustrates one embodiment of our invention for automatically controlling the feeding of a welding electrode in an alternating current welding system;

Fig. 2 diagrammatically illustrates the same embodiment shown in Fig. 1 modified for controlling the feeding of an electrode in a direct current welding system; and Fig. 3 diagrammatically illustrates a further modification of the embodiment illustrated in Fig. 1 for controlling the feeding of a welding electrode in an alternating current welding system.

In Fig. 1 of the drawings a welding electrode 10 is diagrammatically shown in welding relation to the work W having a seam 11 to be welded and between which and the electrode relative movement is produced in any suitable manner. A source of supply of alternating current may be connected to the welding circuit which may comprise conductors 12 and 13 having a reactor R in series relationship therewith, which conductors may be connected to the electrode 10 and work W, respectively. The electrode 10 is fused and deposited in the seam 11 and may be fed toward the work W by cooperating rollers 14 and 15. These rollers may be driven in any suitable manner by an electrode feed motor M and, as diagrammatically shown, the roller 14 is operatively connected by a shaft 16 to the motor M. The motor M may be a compound motor having an armature winding 17 and a series field winding 18 arranged in series relation and connected to terminals 19 and 20, and a shunt field winding 21 connected across the armature 17. The armature 17 is connected through a resistor 21' to a manually operable reversing switch 22 for reversing the direction of rotation of the motor M.

In accordance with our invention the current delivered to the motor M is controlled through the agency of a space discharge device arranged to be responsive to changes in a condition of the welding circuit. In the arrangement illustrated the energization of the electrode feed motor M from a source of supply 23 of alternating current of substantially constant potential is controlled by means of a plurality of grid controlled hot cathode space discharge devices 24 and 25. As illustrated, the source of supply 23 is connected through a circuit including conductors 26 and 27 and a switch 28 to the primary winding 29 of a transformer 30. The transformer 30 is provided with a plurality of secondary windings 32, 33, 34, 35 and 36 which are utilized in the present arrangement, as will be hereinafter described.

The terminals 37 and 38 of the secondary winding are connected through conductors 39 and 40 to anodes 41 and 42 of the space discharge devices 24 and 25. These devices are illustrated as being of the type having cathodes 43 and 44 which are indirectly heated by filaments 45 and 46 connected to the secondary windings 32 and 33, respectively, of the transformer 30. The terminal 19 of the motor M is connected through the primary winding 47 of a transformer 48 and conductor 49 to conductor 50 connecting the cathodes 43 and 44, and the terminal 20 is connected through conductor 51 to the midpoint 52 of the secondary winding 34 of the transformer 30. The control elements or grids 53 and 54 are connected through conductors 55 and 56 to a terminal 57, and in these conductors resistors 58 and 59 may be connected to limit the grid current. A resistor 60 connecting the terminal 57 and conductor 50 may be provided to serve as a grid leak between the grids 53 and 54 and the cathodes 43 and 44.

The single anode devices 24 and 25 are employed jointly as a full wave rectifier and convert the alternating current received from the source of supply 23 to direct current which is delivered to the electrode feed motor M; and the grids 53 and 54 of these devices are connected to be affected by changes in a condition of the welding circuit, as will be hereinafter described, to control the operation of the devices and vary the flow of current through them.

During each alternating current cycle and when, by virtue of the conditions existing in the welding circuit, the grids are positive, current will flow through the devices 24 and 25 from an anode to a cathode during the half cycle an anode voltage is positive with respect to the cathode; and no current will flow from an anode to a cathode during the half cycle an anode is negative with respect to a cathode. With the devices operating as described and the grids positive with respect to the cathodes, direct current is delivered as follows to the electrode feed motor M. During the half cycle of current flow when the terminal 37 of the secondary winding 34 is positive and the terminal 38 thereof is negative, the anode 41 is positive and the anode 42 is negative. Since the anode 41 and grid 53 are positive, the device 24 will permit current to flow from the anode 41 to the cathode 43, and current will pass through a circuit including conductors 50 and 49, primary winding 47 of transformer 48, motor M, conductor 51, the right half portion of secondary winding 34, and conductor 39 back to the anode 41. At the same time no current will pass through the device 25 since the anode 42 is negative with respect to the cathode 44. During the next half cycle the terminal 37 is negative and the terminal 38 is positive, and no current will flow through the device 24 since its anode 41 is negative with respect to the cathode 43. At the same time current will flow through the device 25 in the same manner that current passed through the device 24 during the previous half cycle, and the current will flow through a circuit including conductors 50 and 49, primary winding 47 of transformer 48, motor M, conductor 51, the left half portion of secondary winding 34, and conductor 40 to the anode 42. Thus, when the grids 53 and 54 are positive with respect to the cathodes 43 and 44, current will flow alternately through the devices 24 and 25 over each half cycle and provide direct current for driving the electrode feed motor M.

When the voltage of grids 53 and 54 is more negative with respect to the cathodes 43 and 44 than a value called the critical value, no current will flow through the devices 24 and 25 and the electrode feed motor will stop feeding the electrode 10 toward the work W. On the other hand, when the voltage of the grids is less negative with respect to the cathodes than the critical value, current will flow through each device when its respective anode is positive in proportion to the difference in potential between the grid and cathode and provide direct current to drive the electrode feed motor M.

In accordance with the principles of our invention the control of the electrode feed motor M is arranged to be influenced by the differential value of a condition, such as the voltage, for example, of the welding circuit and a circuit having a substantially constant voltage. In the arrangement illustrated this differential value of voltage is obtained by providing a control circuit and producing therein opposing electromotive forces derived from the welding circuit and the circuit having a substantially constant voltage. In the arrangement illustrated the control circuit serves as the grid circuit of the devices 24 and 25, and the opposing electromotive forces produced therein influence the voltage of the grids 53 and 54 with respect to the cathodes 43 and 44 and control the flow of current to the electrode feed motor M.

In the embodiment shown in Fig. 1 in which an alternating current welding circuit is employed, the control circuit comprises conductors 55 and 56 connected to the grids 53 and 54, conductor 61, resistors 62 and 63 connected in series relation, movable contact 64 associated with the resistor 63, conductor 65, normally closed switch 66, the secondary winding 67 of transformer 48, conductor 49, and conductor 50 connected to the cathodes 43 and 44. We preferably employ a plurality of space discharge devices 68 and 69 for producing in the control circuit opposing electromotive forces derived from the welding circuit and the source of supply 23.

The double anode full wave discharge device 68 is rendered responsive to the voltage of the welding circuit through conductors 70 and 71 connected at one end to conductors 12 and 13, respectively, and at the opposite end to the primary winding 72 of a transformer 73. The terminals of the secondary winding 74 are connected through conductors 75 and 76 to anodes 77 and 78 of the device 68. The device 69 is connected to be responsive to the constant voltage across the secondary winding 35 of the transformer 30, the primary winding of which is connected to the source of supply 23. The terminals of the secondary winding 35 are connected through conductors 79 and 80 to anodes 81 and 82 of the device 69. The cathodes or filaments 83 and 84 of the devices are heated by connecting them through conductors 85 and 86 and 87 and 88 to the terminals of secondary winding 36 of the transformer 30.

One terminal of the resistor 63 is connected through a choke coil 89 and conductor 90 to the midpoint 91 of secondary winding 74 of the transformer 73, and the opposite terminal thereof is connected from the terminal 92 through conductor 93 to the midpoint 94 of the secondary winding 36 of the transformer 30. One terminal of the resistor 62 is connected to the conductor 93 and the opposite terminal thereof is connected from the terminal 95' through a choke coil 95 and conductor 96 to the midpoint 97 of the secondary winding 35 of the transformer 30.

Each of the double anode full wave discharge devices 68 and 69 operates in a well known manner to rectify the alternating current supplied thereto by the windings 74 and 35, respectively, and to deliver direct current. The current flowing through the device 68 alternately during half cycle from the anodes 77 and 78, respectively, to the cathode 83 passes through the conductors 85 and 86, conductors 87 and 88, secondary winding 36, conductor 93, resistor 63, choke coil 89, conductor 90, and alternately during half cycle through the left and right half portions of secondary winding 74 and conductors 75 and 76 back to the anodes 77 and 78. In a similar manner, the current flowing through the device 69 alternately during each half cycle from the anodes 81 and 82 to the cathode 84 passes through conductors 85 and 86, conductors 87 and 88, secondary winding 36, conductor 93, resistor 62, choke coil 95, conductor 96, and alternately during each half cycle through the left and right half portions of the secondary winding 35 and conductors 79 and 80 back to the anodes 81 and 82. The choke coils 89 and 95 serve as filters in the direct current circuits of the devices 68 and 69, and the resistors 62 and 63 act as stabilizing loads in these circuits.

Opposing electromotive forces are impressed across the resistors 63 and 62 in the control circuit in the following manner: In the direct current circuit of the device 69, the terminal 92 will be of positive polarity and the terminal 95' will be of negative polarity because the flow of current through the stabilizing resistor 62 is from the left to the right. Since the source of supply 23 is at a constant voltage, the voltage impressed between the terminals 92 and 95' of the control circuit will be at a substantially constant value. In the direct current circuit of the device 68, the terminal 92 will be of positive polarity and the contact 64 will be of negative polarity because the flow of current through resistor 63 is from the right to the left. The voltage impressed between the terminal 92 and contact 64 in the control circuit is dependent upon the voltage of the welding circuit and, during a normal welding condition with the fusing end of the electrode 10 at its normal position, the contact 64 is adjusted on the resistor 63 so that the voltage impressed between terminal 92 and contact 64 will be less in magnitude than the constant voltage impressed between the terminals 92 and 95'. It will therefore be readily seen that opposing electromotive forces are produced in the control circuit and that the terminal 95' will be more negative than the adjustable contact 64.

In the present arrangement the differential value of these opposing electromotive forces is arranged to control the voltages of the grids with respect to the cathodes of the devices 24 and 25. The negative voltage of this terminal 95' is applied to the grids 53 and 54 through the conductor 61 and conductors 55 and 56, and the negative voltage at the contact 64 is applied to the cathodes 43 and 44 through the conductor 65, normally closed switch 66, secondary winding 67, and conductors 49 and 50. Since the voltage at terminal 95' is more negative than that at contact 64, the voltage of grids 53 and 54 will be negative with respect to the cathodes 43 and 44 and no current will flow through the devices 24 and 25 and the electrode feed motor M will remain deenergized. As the end of the electrode 10 fuses during welding the voltage of the welding circuit becomes greater and hence the voltage impressed between the terminal 92 and contact 64 of the control circuit will also become greater. The polarity of the contact 64 will therefore become more negative and the differential value of voltage between the grids and cathodes of the devices 24 and 25 will decrease. When this differential value of voltage decreases so that the voltage of the grids with respect to the cathodes is less negative than the critical value, current will flow through the devices 24 and 25 in the manner described above in proportion to the difference between the voltage impressed upon the grid and the aforementioned critical value of grid voltage, and direct current will be delivered to the electrode feed motor M to feed the electrode 10 toward the work. As soon as the fusing end of the electrode 10 assumes its normal position with respect to the work W, the voltage of the welding circuit will become normal and the differential value of voltage between the grids and cathodes of the devices 24 and 25 will reach such a value that the grids will become more negative with respect to the cathodes than the critical value. The current will then stop flowing through the devices 24 and 25 and the electrode feed motor will be deenergized. It will thus be seen that the unidirectional flow of current to the feed motor is varied in increments between a maximum and a minimum value in accordance with the variations in the voltage drop between the electrode and the work. During welding this action of the devices 24 and 25 is so rapid that to the eye it appears as if the electrode 10 were being fed continuously in a direction toward the work by the electrode feed motor M although it will be quite evident from the foregoing that the position of the fusing end of the electrode 10 with respect to the work W is under the positive control of the rapidly varying operation of the devices 24 and 25, which are responsive to changes in the voltage of the welding circuit.

Prior to starting a welding operation it may be desirable to adjust the position of the electrode 10. This is readily effected in the arrangement illustrated by opening the normally closed switch 66 in the control circuit. The opening of the switch 66 disconnects contact 64 from the cathodes 43 and 44, and the negative voltage of the grids with respect to the cathodes will be removed because the cathodes will be of the same potential as the grids by reason of the grid leak 60 connecting the terminal 57 of the grids and the cathodes. This will allow current to flow through the devices 24 and 25 and the electrode feed motor will drive the roller 14. When the fusing end of the electrode is at the desired position with respect to the work, the switch 66 is closed and the voltage of the grids is again made negative with respect to the cathodes.

The manually operable switch 22 for reversing the direction of rotation of the motor M may be employed in any preliminary adjustment of the electrode 10 and also utilized to move the electrode from the work after completing a weld.

In order to insure stability of operation of the space discharge devices 24 and 25 and the electrode feed motor M, the transformer 48 is provided having its primary winding 47 connected in the motor circuit and its secondary winding 67 connected in the grid or control circuit of the devices 24 and 25. Thus, when the counter electromotive force of the electrode feed motor M increases during welding or voltage surges are produced through the inductive effect of the motor armature winding 17, any tendency of the space discharge devices to pass out of the critical voltage range and operate prematurely is offset by the compensatory effect produced by the transformer 48 which opposes the inductive effect of the motor armature 17 and prevents the inductive effect being carried over to a succeeding half cycle.

We ordinarily prefer to adjust the space discharge devices 24 and 25 so that the critical value of one of the devices will be slightly different from that of the other device. With this arrangement, as the voltage of the grids becomes less negative with respect to the cathodes than the critical value, current will start flowing through one device before starting to flow through the other of the devices. By adjusting the devices 24 and 25 in this manner and providing the transformer 48 to insure stability of operation of the electrode feed motor, extreme smoothness and uniformity of feeding of the electrode toward the work is obtained. With the slightest change in the voltage of the welding circuit during a welding operation the system responds quickly to maintain the position of the fusing end of the electrode at a substantially constant position with respect to the work. In order to increase the sensitivity of the apparatus a sufficient number of turns are provided in the secondary windings 35 and 74 of the transformers 30 and 73, respectively, to step-up the opposing voltages derived from the welding circuit and the source of supply 23. For example, if the voltage of the welding circuit is 35 volts and the voltage of the supply circuit is 40 volts and these opposing voltages are produced in the control circuit, a one volt sensitivity of the grids 53 and 54 will control the welding circuit voltage within one volt. However, when the welding circuit voltage and opposing voltage in the control circuit are 350 and 355 volts, respectively, after being stepped-up, the same 5 volt differential and one volt sensitivity of the grids will increase the sensitivity of control of the welding circuit voltage approximately ten times. It will therefore be seen that the sensitivity of the apparatus can readily be regulated by employing transformers which step-up the welding circuit voltage and opposing voltage to any desired value.

In Fig. 2 we have shown a modification of the embodiment illustrated in Fig. 1 for controlling the feeding of an electrode in a direct current welding system. In Fig. 2 the space discharge device 68 associated with the welding circuit in Fig. 1 is not employed. In the direct current welding system only the filament 84 of the device 69 is connected through conductors 87' and 88' to the terminals of the secondary winding 36 of the transformer 30. The conductor 12' of the welding circuit is connected through a conductor 93' directly to the terminal 92, and the conductor 13' is connected through a conductor 90' and choke coil 89' to one terminal of the resistor 63, the opposite terminal of which is connected to the terminal 92. In other respects the modification in Fig. 2 is the same as the embodiment illustrated in Fig. 1 with similar numerals to indicate like parts. As in the first described embodiment, the voltage impressed between the terminals 92 and 95' of the control circuit will be at a substantially constant value, such voltage being derived through the device 69 from the source of supply 23. The voltage impressed between the terminal 92 and contact 64 in the control circuit is arranged to oppose the voltage impressed between the terminals 92 and 95', and is dependent upon the voltage of the welding circuit. Since the operation of this modification is the same as that described above in connection with the embodiment illustrated in Fig. 1, it will not be repeated here.

Fig. 3 is a further modification of the embodiment illustrated in Fig. 1 with like parts indicated by the same reference numerals. In this modification we provide several protective devices and means for positively stopping or arresting the electrode feed when the space discharge devices 24 and 25 are effective to disconnect the electrode feed motor from the source of alternating current supply. As shown, a separately excited motor M' having an armature 17' and a field winding 18' is provided to feed the electrode 10 toward the work W. The armature 17' is connected through a manually operable reversing switch 22' and resistor 99 to the terminals 19 and 20 which supply direct current from the space discharge devices 24 and 25. The resistor 99 limits the armature current when the motor M' is started, and is short-circuited by the relay 100 when the armature 17' comes up to speed and develops a counter-electromotive force. A resistor 101 is connected in parallel with the armature 17' and provides dynamic braking of the motor M' when the space discharge devices 24 and 25 are rendered inoperative to deliver direct current to the armature 17'.

One terminal of the separately excited field winding 18' is connected through a conductor 102 to the midpoint 103 of a winding 104 which is connected to the anodes 105 and 106 of a double anode full wave discharge device 107; and the opposite terminal thereof is connected through a conductor 108 to a winding 109 which in turn is connected to the filament 110 of the device 107. The windings 104 and 109 form the secondary windings of a transformer 111, the primary winding 112 of which is connected through a circuit including conductors 113 and 114 and a switch 115 to an alternating current source of supply 23'. The double anode full wave discharge device 107 operates in a well known manner to rectify the current supplied thereto by the winding 104, and to deliver direct current to the field winding 18'.

To insure that the field winding 18' is always excited when the discharge devices 24 and 25 are rendered operative to deliver direct current to the armature 17', the primary winding 29' of the transformer 30' is connected through a circuit including conductors 26' and 27', switch 28', and the cooperating contacts 116 and 117 of relay 118 to the source of supply 23'. When the field winding 18' is excited the coil 119 of relay 118, which is connected across the conductors 102 and 108, is energized and closes the contacts 116 and 117 to connect the transformer 30' to the source of supply 23'. Conversely, when the field winding 18' is not excited, the coil 119 of relay 118 is deenergized and the source of supply 23' is disconnected from the space discharge devices 24 and 25.

In the embodiment illustrated in Fig. 1 the windings 32, 33, 34, 35 and 36 are all secondary windings of the transformer 30. In the modification shown in Fig. 3, only the winding 34' associated with the discharge devices 24 and 25 is a secondary winding of the transformer 30'; and the windings 32', 33', 35', 36' and 104 are secondary windings of the transformer 111. Hence, when the switch 115 is closed, all of the filaments 45, 46, 110, 84 and 83 of the discharge devices 24, 25, 107, 69 and 68, respectively, will be heated. Further, the discharge device 107 will deliver direct current to excite the field winding 18' and render the relay 118 operative to connect the transformer 30' to the source of supply 23'.

The operation of this modification is substantially the same as that described above in connection with the embodiment shown in Fig. 1. When the discharge devices 24 and 25 are rendered inoperative by the control circuit, no direct current is supplied to the motor armature 17'. The field winding 18' will remain excited and, due to the dynamic braking effect of the resistor 101, the motor M' will not tend to overrun and feed the electrode past the predetermined position which influenced the control circuit to render the discharge devices 24 and 25 inoperative.

While we have shown three arrangements for automatically controlling the feeding of an electrode in accordance with the differential value of a condition of the welding circuit and a circuit having a condition thereof substantially constant, other arrangements will occur to those skilled in the art. For example, in a direct current welding system the opposing electromotive forces in the control circuit may be derived from the welding circuit and a direct current circuit having a condition thereof constant. Also, the control circuit in which opposing electromotive forces are produced may be connected in any other suitable manner to means which will influence and control the feeding of the electrode to the work. We therefore intend in the appended claims to cover such variations and modifications as fall within the true spirit and scope of our invention.

We claim:—

1. In a welding system comprising the combination of a welding circuit including a movable electrode and the work, the combination of means automatically operative during normal welding operation to feed the electrode only in a direction toward the work, a control circuit, means for producing in said control circuit an electromotive force responsive to a condition of the welding circuit, means for producing in said control circuit a substantially constant electromotive force, and means responsive to the resultant value of the electromotive forces produced in said control circuit to vary the speed of operation of said feeding to regulate the rate at which the electrode is fed to the work.

2. In a welding system comprising a welding circuit including a movable electrode and the work, the combination of means automatically operative during normal welding operations to feed the electrode only in a direction toward the work; and means, including a control circuit, for controlling said feeding means to regulate the rate at which the electrode is fed to the work by varying the magnitude of the current applied to said feeding means in increments between a maximum and a minimum value, said controlling means including means for producing in said control circuit an electromotive force responsive to a condition of the welding circuit; and means for producing in said control circuit an electromotive force opposing said first-mentioned electromotive force.

3. In a welding system comprising a welding circuit including cooperating electrodes, one of which is movable toward the other, the combination of electrically operable means automatically operative during normal welding operation to feed the movable electrode only in a direction toward the other electrode, a control circuit, means for producing in said control circuit an electromotive force responsive to a condition of said welding circuit, means for producing in said control circuit an electromotive force of substantially constant value opposing the first-mentioned electromotive force, and means responsive to the differential value of the opposing electromotive forces produced in said control circuit to vary the speed of operation of said feeding means between predetermined limits to regulate the rate at which the movable electrode is fed toward the other electrode.

4. In a welding system comprising a welding circuit including a movable electrode and the work, the combination of means automatically operative during normal welding operation to feed the movable electrode only in a direction toward the work, a control circuit, means for producing in said control circuit an electromotive force responsive to changes of a condition of said welding circuit from a predetermined normal value, means for producing in said control circuit an electromotive force of substantially constant value opposing the first-mentioned electromotive force, means responsive to changes in the differential value of the opposing electromotive forces produced in said control circuit to vary the speed of operation of said feeding means between predetermined limits to regulate the rate at which the electrode is fed to the work, and means for initially varying the value of one of the electromotive forces produced in said control circuit to adjust the differential value thereof when the condition of said welding circuit is at a predetermined value.

5. In a welding system comprising a welding circuit including a movable electrode and the work; the combination of means automatically operative during normal welding operation to feed the electrode only in a direction toward the work, a control circuit including two resistors connected in series relation, means for impressing across one of said resistors a direct current electromotive force responsive to a condition of said welding circuit, means for impressing across the other of said resistors a direct current electromotive force of substantially constant value opposing the first-mentioned electromotive force, and means associated with said control circuit and responsive to the differential value of the opposing electromotive forces produced therein to vary the speed of operation of said feeding means between predetermined limits to regulate the rate at which the electrode is fed to the work.

6. In an alternating current welding system including a welding circuit comprising cooperating electrodes, at least one of which is movable, the combination of means automatically operative during normal welding operation to feed the movable electrode only in a direction toward the other electrode, a control circuit, rectifying means associated with said welding circuit and connected to said control circuit for producing in the latter a direct current electromotive force responsive to a condition of said welding circuit, means for producing in said control circuit a direct current electromotive force of substantially constant value opposing the first-mentioned electromotive force, and means associated with said control circuit and responsive to the differential value of electromotive forces produced therein to vary the speed of said feeding means between predetermined limits to regulate the rate at which the movable electrode is fed toward the other electrode.

7. In a welding system comprising a welding circuit including a movable electrode and the work, the combination of means automatically operative during normal welding operation to feed the electrode only in a direction toward the work, said feeding means including a motor having a circuit connected thereto, a control circuit, means for producing in said control circuit an electromotive force responsive to a condition of said welding circuit, means for producing in said control circuit an electromotive force of substantially constant value opposing the first-mentioned electromotive force, means associated with said control circuit and responsive to the differential value of the opposing electromotive forces produced therein for varying the speed of said feeding means between predetermined limits to regulate the rate at which the electrode is fed to the work, and a transformer having a primary winding connected in series relation with said motor circuit and a secondary winding connected in series relation with said control circuit.

8. In a welding system comprising a welding circuit including a movable electrode and the work, the combination of means for feeding the electrode to the work, a control circuit, means for producing in said control circuit an electromotive force responsive to a condition of said welding circuit, means for producing in said control circuit an electromotive force of substantially constant value opposing the first-mentioned electromotive force, means associated with said control circuit and responsive to the differential value of the opposing electromotive forces produced therein for controlling said feeding means, said controlling means being arranged to effect the operation of said feeding means when said control circuit is open, and means for opening said control circuit.

9. In an alternating current welding system comprising a welding circuit including cooperating electrodes, at least one of which is movable, the combination of means for feeding the movable electrode, a control circuit, an alternating current source of supply having an electromotive force of substantially constant value, rectifying means associated with said welding circuit and connected to said control circuit for producing in the latter a direct current electromotive force responsive to a condition of said welding circuit, rectifying means associated with said source of supply and connected to said control circuit for producing in the latter a direct current electromotive force opposing the first-mentioned electromotive force, and means associated with said control circuit and responsive to the differential value of electromotive forces produced therein for varying the speed of operation of said feeding means between predetermined limits.

10. In a direct current welding system comprising a welding circuit including a movable electrode and the work, the combination of means automatically operative during normal welding operation to feed the movable electrode only in a direction toward the work, a control circuit, an alternating current source of supply having an electromotive force of substantially constant value, means for connecting said welding circuit to said control circuit to produce in the latter a direct current electromotive force responsive to a condition of said welding circuit, rectifying means associated with said source of supply and connected to said control circuit for producing in the latter a direct current electromotive force opposing said first-mentioned electromotive force, and means associated with said control circuit and responsive to the differential value of the electromotive forces produced therein for varying the speed of operation of said feeding means between predetermined limits to regulate the rate at which the movable electrode is fed to the work.

11. In a welding system comprising a welding circuit including a movable electrode and the work, the combination of electrically operable means for feeding the electrode only in a direction toward the work, a circuit having a condition thereof at a substantially constant value, and means responsive to the differential value of the condition of said welding and last-mentioned circuits for varying the magnitude of the current flowing to said electrically operable feeding means in increments between a maximum and a minimum value to vary the speed of said feeding means.

12. In a welding system comprising a welding circuit including a movable electrode and the work, the combination of electrically operable means for feeding the electrode only in a direction toward the work, a circuit having a condition thereof at a substantially constant value, and means including a space discharge device responsive to the differential value of the condition of said welding and last-mentioned circuits for varying the magnitude of the current flowing to said electrically operable feeding means in increments between a maximum and a minimum value to vary the speed of said feeding means.

13. In a welding system comprising a welding circuit including a movable electrode and the work, the combination of electrically operable means having a circuit connected thereto for feeding the electrode only in a direction toward the work, a grid controlled space discharge device arranged in said last-mentioned circuit, and means for connecting the grid of said device to be responsive to a condition of said welding circuit for controlling the voltage thereof above and below its critical value to vary the magnitude of the current flowing to said device in increments between a maximum and a minimum value to vary the speed of said electrically operable feeding means.

14. In a welding system comprising a welding circuit including cooperating electrodes, at least one of which is movable toward the other, electrically operable means for feeding the movable electrode only in a direction toward the other electrode, a circuit having a condition thereof at a substantially constant value, a grid controlled space discharge device for controlling the unidirectional flow of current to said electrically operable feeding means to vary the speed of the latter, and means for connecting the grid of said device to be responsive to the differential value of the condition of said welding and last-mentioned circuits for controlling the voltage thereof above and below its critical value to vary the magnitude of the current flowing to said device in increments between a maximum and a minimum value.

15. In a welding system comprising a welding circuit including cooperating electrodes, at least one of which is movable, the combination of means automatically operative during normal welding operation to feed the movable electrode only in a direction toward the other electrode; a control circuit; means for producing in said control circuit an electromotive force responsive to a condition of said welding circuit; means for producing in said control circuit an electromotive force of substantially constant value opposing the first-mentioned electromotive force; and means, including a space discharge device responsive to the differential value of the electromotive forces produced in said control circuit, to vary the speed of operation of said feeding means between predetermined limits to regulate the rate at which the movable electrode is fed toward the other electrode.

16. In a welding system comprising a welding circuit including a movable electrode and the work, the combination of electrically operable means automatically operative during normal welding operation to feed the electrode only in a direction toward the work, a circuit associated with said electrically operable means, a control circuit, means for producing in said control circuit an electromotive force responsive to a condition of said welding circuit, means for producing in said control circuit an electromotive force of substantially constant value opposing the first-mentioned electromotive force, and a grid controlled space discharge device arranged in the circuit associated with said electrically operable means, the grid of said device being associated with said control circuit and responsive to the resultant electromotive force therein to control the flow of current to said device to vary the speed of operation of said electrically operable means between predetermined limits for regulating the rate at which said movable electrode is fed to the work.

17. In a welding system comprising a welding circuit including a movable electrode and the work and a source of supply of alternating current, the combination of electrically operable means automatically operative during normal welding operation to feed the electrode only in a direction toward the work, a control circuit, means for producing in said control circuit an electromotive force responsive to a condition of the welding circuit, means for producing in said control circuit an electromotive force of substantially constant value opposing the first-mentioned electromotive force, and rectifying means associated with said source of supply and connected to said electrically operable means for supplying direct current to the latter, said rectifying means having a control element associated with said control circuit to vary the magnitude of the current supplied to said electrically operable means in increments between a maximum and a minimum value in response to the differential of voltage between said two opposing electromotive forces.

18. In a welding system comprising a welding circuit including cooperating electrodes, one of which is movable, and a source of supply of alternating current, the combination of electrically operable means for feeding the movable electrode only in a direction toward said other electrode, a control circuit, means for producing in said control circuit a direct current electromotive force responsive to a condition of the welding circuit, means for producing in said control circuit a direct current electromotive force of substantially constant value opposing the first-mentioned electromotive force, rectifying means including a space discharge device associated with the source of supply and connected to said feeding means for delivering direct current to the latter, said space discharge device having a grid and a cathode, and means for connecting said control circuit to said grid and cathode to control the voltage of the grid with respect to the cathode above and below the critical value in response to the differential value of the opposing electromotive forces produced in said control circuit to vary the magnitude of the flow of current supplied to said electrically operable means in increments between a maximum and a minimum value.

19. In a welding system comprising a welding circuit including a movable electrode and the work, the combination of electrically operable means automatically operative during normal welding operation to feed the movable electrode only in a direction toward the work, a control circuit including two resistance elements connected in series relation, means for impressing across one of said resistance elements a direct current electromotive force responsive to a condition of said welding circuit, means for impressing across the other of said resistance elements a direct current electromotive force of substantially constant value opposing the first-mentioned electromotive force, a space discharge device for controlling said electrically operable feeding means, said device having a control element, and means for connecting said control element to said control circuit to respond to the differential of voltage between said two opposing electromotive forces for varying the magnitude of the flow of current to said electrically operable means in increments between a maximum and a minimum value.

20. In a welding system comprising a welding circuit including a movable electrode and the work and a source of supply of alternating current, the combination of electrically operable means for feeding the electrode only in a direction toward the work, a control circuit including at least two resistors connected in series relation, means for impressing across one of said resistors a direct current electromotive force responsive to a condition of said welding circuit, means for impressing across the other of said resistors a direct current electromotive force of substantially constant value opposing the first-mentioned electromotive force, rectifying means associated with the source of supply and connected to said feeding means for delivering direct current to the latter, said rectifying means having a control element to vary the magnitude of the flow of current to said feeding means in increments between a maximum and a minimum value, and means for connecting said control element to said control circuit to respond to the differential of voltage between said two opposing electromotive forces.

21. In a welding system comprising a welding circuit including a movable electrode and the work, the combination of means for feeding the electrode to the work including an electric motor having a circuit associated therewith, means responsive to a condition of said welding circuit for controlling the flow of current to said motor, and means associated with said motor circuit tending to prevent overrunning of said motor when the flow of current thereto is arrested.

22. In a welding system comprising a welding circuit including a movable electrode and the work, the combination of means including an electric motor having a circuit associated therewith, a circuit having a condition thereof at a substantially constant value, means responsive to the differential value of the condition of said welding and last-mentioned circuits for controlling the flow of current to said electric motor, and means associated with said motor circuit tending to prevent overrunning of said motor when the flow of current thereto is arrested.

23. In a welding system comprising a welding circuit including a movable electrode and the work, the combination of means for feeding the electrode to the work including an electric motor having an armature and a field winding, a source of supply of electrical energy, means for connecting said source of supply to said armature, means for separately exciting said field winding, means associated with said connecting means for rendering the same operative only when said field winding is excited, and additional means associated with said connecting means and responsive to a condition of said welding circuit for controlling the flow of current to said armature.

24. In a welding system comprising a welding circuit including a movable electrode and the work, the combination of electrically operable means for feeding the electrode to the work, a control circuit associated with said welding circuit, rectifying means adapted to be connected to an alternating current source of supply and also connected to said electrically operable feeding means for supplying direct current to the latter, said rectifying means including a control element associated with said control circuit, and means associated with said electrically operable feeding means and said control circuit for maintaining the feeding means stable in operation by neutralizing surges in the voltage of the circuit of said electrically operable feeding means.

25. In a welding system comprising a welding circuit including a movable electrode and the work, the combination of means for feeding the electrode to the work including an electric motor having an armature winding, rectifying means adapted to be connected to an alternating current source of supply and also connected to said armature winding for supplying direct current to the latter, said rectifying means including a control element, means for rendering said control element responsive to a condition of said welding circuit, and means associated with said armature winding for opposing the inductive effect thereof to maintain said motor stable in operation.

26. In a welding system comprising a welding circuit including a movable electrode and the work, the combination of means for feeding the electrode to the work including an electric motor having armature and field windings, means for separately exciting said field winding, rectifying means including a pair of space discharge devices adapted to be connected to an alternating current source of supply and also connected to said armature winding for supplying direct current to the latter, said space discharge devices including a control element, means including a control circuit associated with said control element for rendering the latter responsive to a condition of said welding circuit, and means including a transformer having a primary winding associated with said armature winding and a secondary winding associated with said control circuit for maintaining said space discharge devices stable in operation.

27. In a welding system comprising a welding circuit including a movable electrode and the work, the combination of means for feeding the electrode to the work including an electric motor having an armature winding, a circuit having a condition thereof at a substantially constant value, means responsive to the resultant value of the condition of said welding and last-mentioned circuits for permitting and arresting the flow of current to said armature winding to render said motor operative or inoperative, and means adapted to be automatically connected in series with said armature winding and operative when the flow of current to said armature winding is arrested for preventing overrunning of said motor.

28. In a welding system comprising a welding circuit including a movable electrode and the work, the combination of means for feeding the electrode to the work including an electric motor having armature and field windings, means for separately exciting said field winding, a circuit having a condition thereof at a substantially constant value, means responsive to the resultant value of the condition of said welding and last-mentioned circuits for permitting and arresting the flow of current to said armature winding to render said motor operative or inoperative, and means associated with said armature winding tending to prevent overrunning of said motor when the flow of current to said armature winding is arrested.

29. In a welding system comprising cooperating electrodes, the combination of means to feed one of said electrodes only in a direction toward the other of said electrodes; a control circuit for said means; and means, incorporated in said control circuit and responsive to the difference in the voltage drop across the electrodes and a source of substantially constant potential connected in opposition thereto, to open or close said control circuit to permit or arrest the operation of said feeding means.

30. In an alternating current electric welding system, a welding circuit including a movable electrode and the work; an electrically operable mechanism for moving said electrode relatively to said work; energizing means for said mechanism, said energizing means including a source of alternating current energy and a control means for varying the speed of operation of said mechanism; means for impressing on said control means a rectified electromotive force of substantially constant value derived from said source of alternating current energy; and means for impressing on said control means, in opposition to said constant electromotive force, a rectified electromotive force of a variable value derived from said welding circuit.

31. In a welding system comprising a welding circuit including a pair of cooperating relatively movable electrodes; means for moving one of said electrodes toward the other of said electrodes; and a pair of cooperating grid controlled space discharge devices for supplying unidirectional current to said means, the grids of said space discharge devices being responsive to variation in the voltage across the welding electrode for varying the flow of current to said devices in increments between a maximum and a minimum value, the critical grid voltage of one of said space discharge devices having a value different from that of the critical grid voltage of the other of said space discharge devices.

32. In an alternating current electric welding system, a welding circuit including a pair of relatively movable electrodes; a direct current motor for moving one of said electrodes relatively to the other of said electrodes, said motor including a stator element and a rotor element; a source of alternating current energy; means for impressing on one of said elements a rectified electromotive force of substantially constant value derived from said source of alternating current energy; means for supplying direct current to the other of said elements, said means including said source of alternating current energy and a control means for varying the speed of operation of said motor; means for impressing on said control means a rectified electromotive force of substantially constant value derived from said source of alternating current energy; and means for impressing on said control means, in opposition to said constant electromotive force, a rectified electromotive force of variable value derived from said welding circuit.

HARRY E. KENNEDY.
     MAYNARD A. ROTERMUND.
     LLOYD T. JONES.